United States Patent [19]

Blackman

[11] Patent Number: 4,964,798

[45] Date of Patent: Oct. 23, 1990

[54] METHOD AND APPARATUS FOR QUICKLY PURGING ATMOSPHERE GAS FROM BELL FURNACE

[76] Inventor: Calvin C. Blackman, 5419 Park Dr., Vermilion, Ohio 44089

[21] Appl. No.: 351,198

[22] Filed: Jun. 12, 1989

Related U.S. Application Data

[62] Division of Ser. No. 206,716, Jun. 15, 1988, Pat. No. 4,867,675.

[51] Int. Cl.$^5$ ............................ F16K 1/00; F27B 9/04

[52] U.S. Cl. ........................................ 432/23; 432/24; 432/205; 432/206

[58] Field of Search .............. 432/205, 206, 23, 254.1, 432/254.2; 266/256

[56] References Cited

U.S. PATENT DOCUMENTS

| | | | |
|---|---|---|---|
| 2,309,700 | 2/1943 | Huff | 432/254.2 |
| 2,971,871 | 2/1961 | Beggs | 432/254.2 |
| 3,540,710 | 11/1970 | Yamagishi | 432/206 |
| 3,603,570 | 9/1971 | Galcone | 432/206 |
| 3,832,129 | 8/1974 | Derbyshire et al. | 432/254.2 |
| 4,596,526 | 6/1986 | Soliman | 432/205 |

*Primary Examiner*—Henry C. Yuen

*Attorney, Agent, or Firm*—Calfee, Halter & Griswold

[57] ABSTRACT

A method and apparatus for vacuum purging bell type furnaces is provided. A vacuum shell unit is provided which is removably emplacible over the inner cover of the furnce and has a vacuum tight seal to the base. A vacuum is pulled both within the inner cover and within the vacuum shell to remove the ambient gas. Nitrogen is then introduced into the inner cover and within the vacuum shell. The vacuum shell is then removed and purging continues within the inner cover either with nitrogen or other desired atmosphere gas, and finally furnace is emplaced over the inner cover to heat treat the work in a conventional manner.

3 Claims, 4 Drawing Sheets

METHOD AND APPARATUS FOR QUICKLY PURGING ATMOSPHERE GAS FROM BELL FURNACE

This a division of application Ser. No. 7/206,716, filed Jun. 15, 1988; now U.S. Pat. No. 4,867,675.

BACKGROUND OF THE INVENTION

Bell type furnaces are generally used in industry for the annealing of coiled strip and rod or wire coils as well as annealing other material. These furnaces provide the varied annealing cycles for various grades of steel and non-ferrous products. They are well suited to large production requirements as in the large steel mills or to small plants providing specialty annealed products. Much of this production requires more specialized annealing procedures and particularly control of the protective atmosphere for carburizing, spheroidizing, anneal without decarburization, etc.

Present standard bell furnaces utilize seals on the inner cover or retort of solid material (compressed sponge rubber or the like), or liquid seals (oil or water for non-ferrous material), and sand or ceraminc wool seals. None of these seals is suitable for vacuum annealing since they have limited sealing properties, generally being effective to seal against only very low pressure difference, e.g. less than about 6" to 8" w.c. Presently certain special products require very pure atmospheres and vacuum furnaces with "O" ring clamp down seals are being utilized. These vacuum furnaces and "O" ring base to inner cover seals require precision machining and are very costly. In addition, larger diameter sizes increase the cost of machining and the thickness of inner cover retorts which are stainless steel, and therefore, quite costly.

The prior art bell furnace annealing system consists of multiples of bases suitable for supporting the coil charges and the bases include large volume circulating fans to circulate the protective atmosphere during heating and cooling of the metal. Since sooling times required to cool the charge are generally much longer than the required heaing time, each base load is covered by the inner cover or retort of stainless steel and sealed to the base. To prevent oxidation or decarburization of the metal, a purge of the air is made by flushing nitrogen or other oxygen free gas through the charge area until a safe protective control atmosphere is obtained. The bell furnace, which is portable like the inner cover, is then placed on the base over the inner cover containing the work coils. The furnace which provides the heat is operated and controlled by temperature and time, then removed by crane and placed on another base and inner cover which has been purged and ready for heating. The inner cover and charge which are on the base continues to cool with a flow of protective atmosphere until a temperature is reached suitable for uncovering. The atmosphere is stopped, the inner cover unsealed during removal from the base, and the coils of steel or work are removed from the base. Another charge is loaded and the procedures repeated for the new charge.

The purging of the inner cover and work particularly to remove oxygen as part of the air is critical to obtaining a suitable atmosphere prior to heating the work. Normally once the inner cover is sealed to the base, this purging of the air is accomplished by flowing large volumes of nitrogen atmosphere into the inner cover and exhausting it through an oulet pipe until oxygen is low enough to permit heating without oxidation of the work. It is also important to reduce the dewpoints of the atmosphere to the point where oxidation or carbon reduction will not take place. This requires more purging and a long time is consumed, requiring many turnovers in the volume of gas removed until a sufficiently low level of oxygen and water vapor nitrogen or other inert atmosphere is acheived.

SUMMARY OF THE INVENTION

According to the present invention, the reduction of the unwanted oxygen and/or water vapor can be quickly and efficiently accomplished. This is accomplished by providing a seperate vacuum shell or purge unit which is portable like the furnace and can be moved from base to base for purging only. A high efficiency vacuum seal is provided to seal between the vaccum purge unit and a portion of the base. A vacuum pump and related equipment including controls and pipe connections to the base inside and outside of the inner cover and to the supply atmosphere gas are provided. After the inner cover or retort is emplaced, the vacuum shell is emplaced and sealed, and a vacuum is pulled within both the inner cover and the vacuum shell, which removes essentially all of oxygen and/or water vapor and all other unwanted contaminants. Once the vacuum is pulled, the exhaust valves are closed, and the desired atmosphere, e.g. nitrogen is flowed into the inner cover surrounding the work piece and also between the inner cover and the vacuum shell. At this point, the vacuum shell is removed, and the flow of the nitrogen or other atmosphere gas continues.

The work and inner area of the inner cover have been vacuum purged by pulling the air from the volume inside of the inner cover and the volume inside the vaccum purge unit and outside of the inner cover, both at the same time and pressure by equalizing pipe connections. The normal seal of the bell cover and base is not exposed to any abnormal pressures so that on pressures returning to normal after back gassing the purge unit is removed and normal conditions are re-established to allow proceeding with the annealing cycle. A normal annealing cycle follows with conventional operation of the equipment.

By means of a fast vacuum purge, time has been saved as well as nitrogen atmosphere equivalent to a number of volume changes. Vacuum purge has also insured the removal of all original air and vapors to 1/75 or less even within the coil laminations insulation voids etc. Prior art purging would not necessarily have removed contaminants from these confined areas as there is no pressure gradiant to expel them from such areas.

DESCRIPTION OF THE PREFERRED EMBODIMENTS

Figure 1:
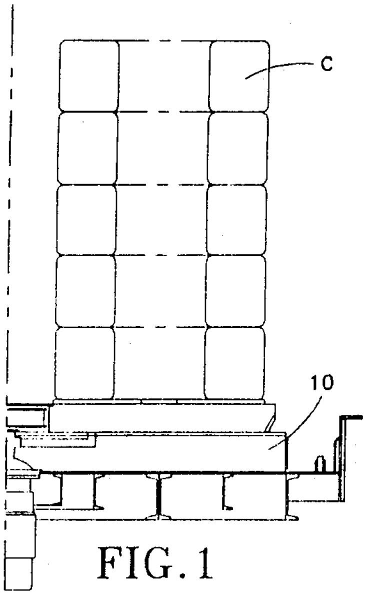
FIG. 1 is a side elevational view partially in section and somewhat schematic of a bell type furnace base with a work load supported thereon.
Figure 2:
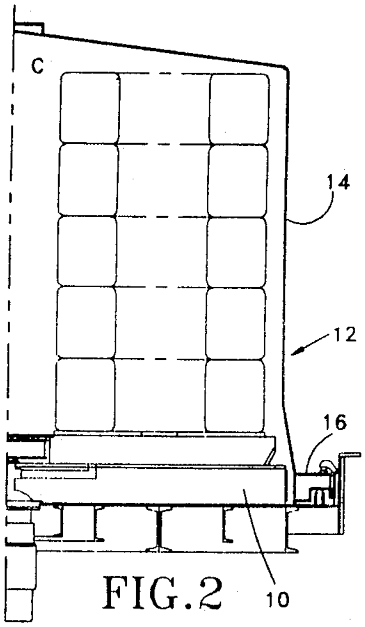
FIG. 2 is a view similar to FIG. 1 with the inner cover emplaced.
Figure 3:
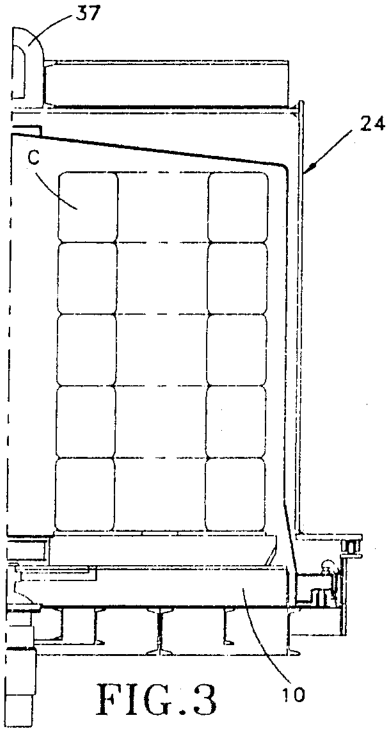
FIG. 3 is a view similar to FIG. 2 with a vacuum shell according to this invention emplaced on and sealed around the cover and base.

Referring now to the drawings, and for the present to FIG. 1, a bell type furnace base 10 is shown in half section with work to be annealed in the form of coils C of strip mounted on the base 10. A conventional inner cover 12 is shown in FIG. 2 placed over and enclosing the coils C. As can best be seen in FIGS. 5 and 6, the inner cover has a dome portion 14 and a lower annular sealing ring 16 which rests on a foam or sponge rubber seat 18. For additional cooling the annular sealing ring is fabricated to be fluid tight and water is supplied thereto by a pipe 20, carried by the base and fitting 22 carried by the sealing ring releasably connected to the pipe 20. The water is drained through a drain opening (not shown). As discussed above, this seal is limited to very low pressure differential, e.g. 6" to 8" w.c. and would not be effective as a vacuum seal. Further, even if this could be modified as a vacuum seal, a normal inner cover would not have sufficient strength to support the atmosphere pressure and would collapse under any significant degree of vacuum.

A vacuum shell or purge unit 24 is provided and is adapted to overlie the inner cover 12 and engage the base 10 in sealing relationship. The vacuum shell 24 is constructed to withstand collapsing under atmosphere pressure even at a relatively high vacuum (e.g. 1 to 10 TOR), and includes a dome portion 26 and a lower flange 28. The lower flange 28 is provided with a pneumatically inflatable elastomeric tube 30 disposed within an annular groove 32 formed by a pair of spaced rails 34 and 36 depending from the flange 28. The tube 30 can be inflated from a source of air or water pressure (not shown). A lifting eye 37 is secured to the top of the dome 26 to allow a crane to emplace and remove the shell 24.

The base 10 includes a convection fan or impeller 38 driven by motor 39 (FIG. 5), and constitutes a gas tight enclosure within the shell 24 when sealed by tube 30.

Figure 5:
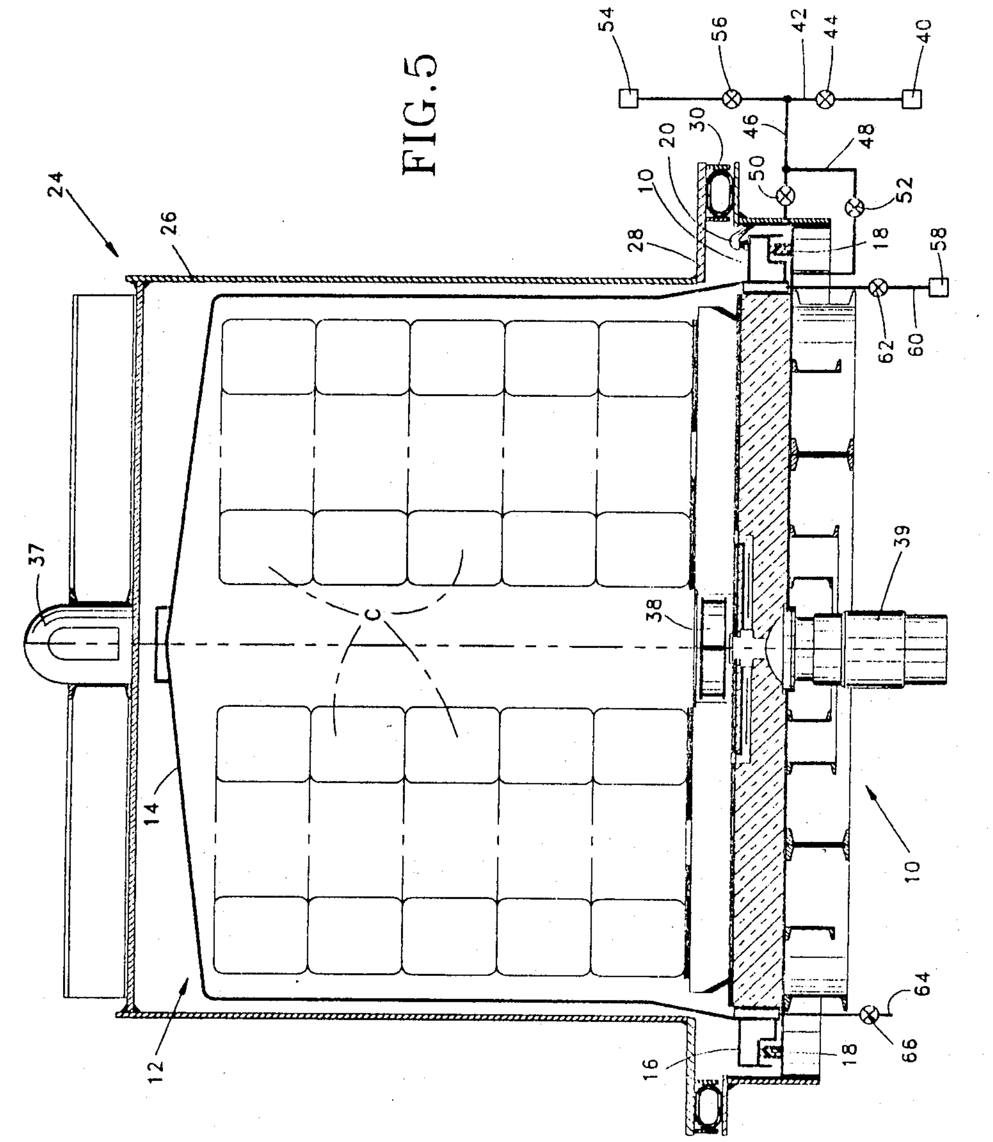
FIG. 5 is a view on an enlarged scale from FIG. 3 showing the inner cover and vacuum shell in place.
Figure 6:
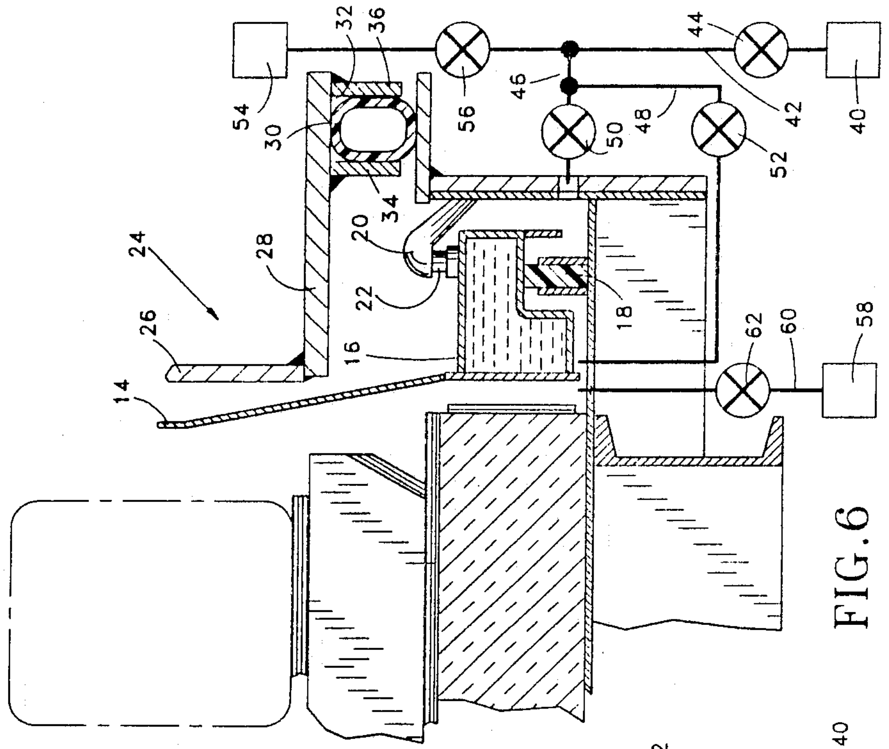
FIG. 6 is an enlarged detail view similar to FIG. 5 showing one embodiment of sealing of the vacuum shell.

As can best be seen in FIGS. 5 and 6, a vacuum pump 40 is connected by main line 42 through valve 44 and a pair of delivery lines 46 and 48 to the interior of the vacuum shell 24. The delivery line 46 is connected through valve 50 to the space between the inner cover 12 and the vacuum shell 24, and the delivery line 48 is connected through valve 52 to the space within the inner cover 12 surrounding the coils C. The main line 42 is also connected to a supply 54 of nitrogen or other inert gas through valve 56.

To complete the installation, a source of annealing atmosphere gas 58 is provided which is connected to line 60 and through valve 62 to the space within the inner cover 12. An exhaust pipe 64 is positioned on the opposite side from the line 60 which through valve 66 can vent the gas from within the inner cover to atmosphere.

Figure 7:
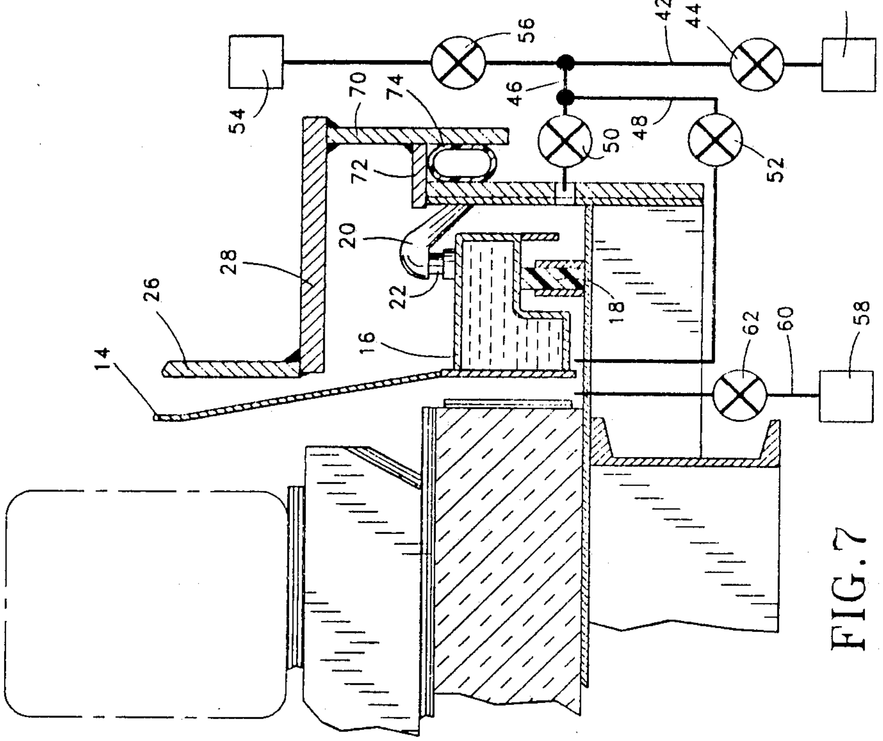
FIG. 7 is a view similar to FIG. 6 showing another embodiment of the seal for the vacuum shell.

FIG. 7 shows a device wherein the seal on the vacuum shell 24 is modified slightly from that shown in FIG. 6. In this embodiment, the flange 28 has a depending member 70 which has an arm 72 extending inwardly therefrom. A pneumatically inflatable sealing tube 74 is carried at the intersection of the depending member 70 and arm 72 and as the arm 72 rests on the base to support the vacuum shell, the sealing tube is inflated from a source of air or water pressure (not shown) to seal against the base 10, the member 70, and arm 72.

Figure 8:
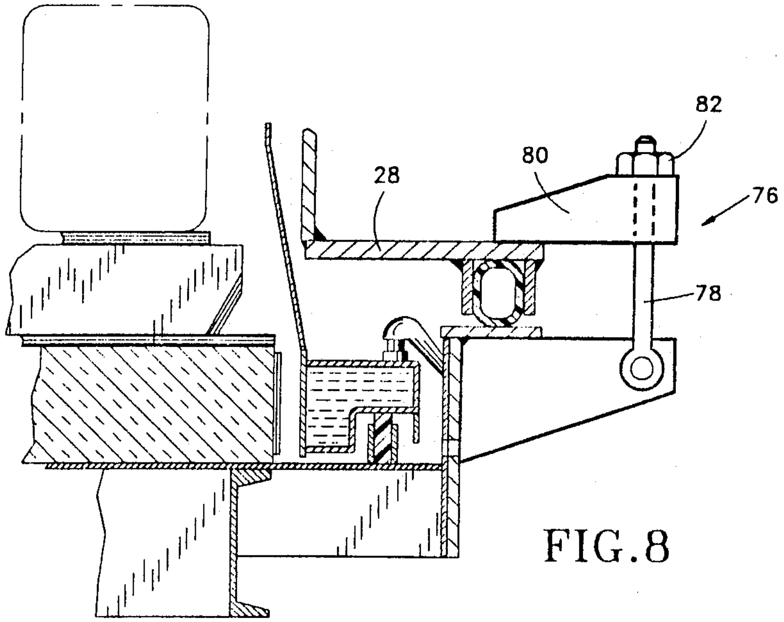
FIG. 8 is a detail view of a vacuum shell similar to the one in FIG. 6, showing a clamp for holding the vacuum shell.

FIg. 8 is similar to FIG. 6, but the base is provided with a series of circumferential spaced clamp members, one of which is shown at 76. The clamp members include a pivoting toggle bolt 78, which slidably mounts a clamp arm 80 which can be tightened over and held against flange 28 by means of a nut 82. This will securely hold the vacuum shell in place.

In operation, the work C is first placed on the base 10 in a conventional manner, and the inner cover 12 is placed thereon forming a seal with the base 10. The pipe 20 is connected to the fitting 22 and water is circulated. With conventional prior art partices, purging gas would be pumped through the inner cover and exhausted, and this would continue until, by continuous dilution, the oxygen and a water vapor would be reduced to acceptable levels.

Figure 4:
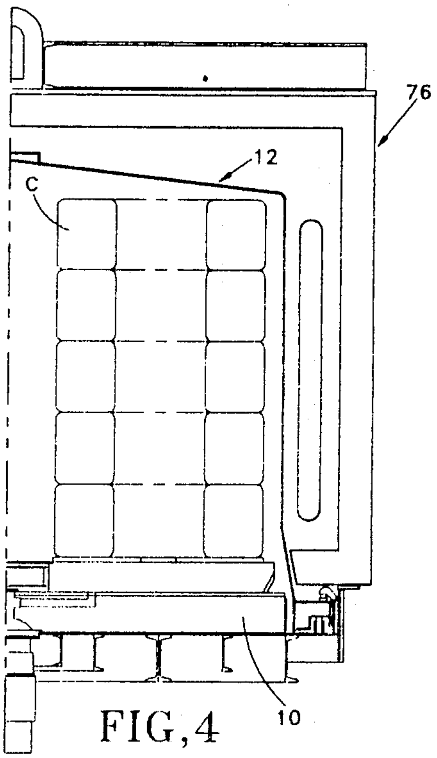
FIG. 4 is a view similar to FIG. 3 but with the vacuum shell removed and the furnace member emplaced over the cover and on the base.

However, according to this invention, when the inner cover 12 is in place, the vacuum shell 24 is then placed over the inner cover and sealed to the base. At this point, the valves 56, 62, and 66 are closed and valves 44, 50, and 52 are opened. The vacuum pump is started and a vacuum is pulled both within the inner cover 12 through line 48 and between the inner cover 12 and vaccum shell 24 through line 46. By drawing a vacuum in both of these spaces, the inner cover 12 is not subjected to unequal pressure and hence will not collapse, and hence need not be of reinforced structure. The vaccum pump 40 is operated until the level of oxygen and other contaminants are at the desired level. The vacuum pump 40 is then stopped, the valve 44 closed, and the valve 56 opened to cause a flow of nitrogen to both the space within the inner cover 12 through line 48 and between the inner cover 12 and vacuum shell 24 through line 46. By supplying the purging nitrogen gas to both of these spaces, there is no pressure differential caused and hence no stress is placed on the inner cover. At this point, valve 50 can be closed and valve 66 can be opened and nitrogen gas flow continued within the inner cover. This gas flow will, by dilution and exhaust, reduce to an even lower level of any remaining trapped gases after the vacuum purge. The vacuum shell 24 is now removed after closing valve 50, and a conventional furnace member 76 is placed over the inner cover as shown in FIG. 4. The atmosphere within the inner cover 12 can now be converted to the desired annealing atmosphere (if it is other than nitrogen) by closing valve 56 and opening valve 62 allowing the selected or desired gas atmosphere to enter and purge the nitrogen while the furnace member 76 is heating.

It is also within the purview of this invention to mount various pieces of the equipment, e.g. the vacuum pump 40 and any controls, on the vacuum shell 24, and thereby have such equipment movable directly with the vacuum shell.

Figure 9:
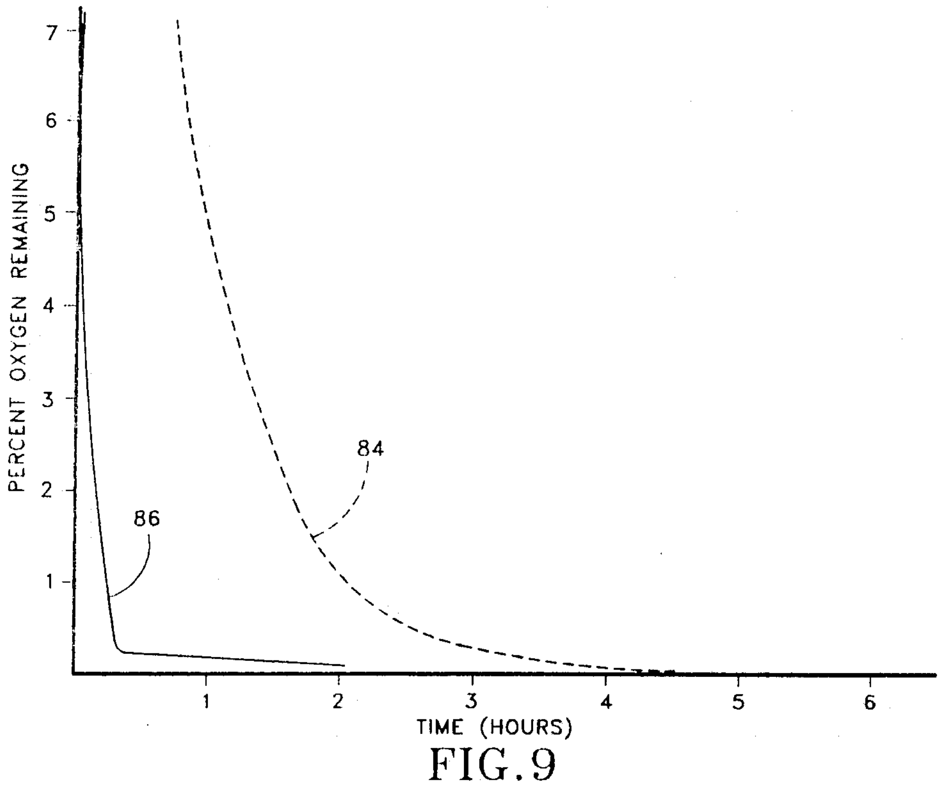
FIG. 9 is a graph showing the time required to purge the furnace according to this invention as compared to conventional prior art techniques.

The relative effectiveness of the present invention is shown in the graph in FIG. 9. This graph plots the percent oxygen as a function of time and total volume turnovers utilizing conventional prior art purging techniques, as compared to the technique of the present invention in a typical furnace cycle. Curve 84 shows the conventional technique wherein the purge gas is flowed through the inner cover, and curve 86 shows the relationship when the present invention is practiced. It can be seen that the oxygen level reaches 6% only after about 1 hours of purging according to prior art techniques wherein it reaches this level after only about 5 minutes of pulling a vacuum according to this technique, and it takes over 3 hours with the prior art techniques for the oxygen level to reach 0.25% as opposed to reaching this level in less than ½ hour according to the technique of this invention.

At about this vacuum level (depending upon the efficiency of the vacuum pump) which in the illustrated embodiment is a pressue of about 10 TOR, the vacuum is discontinued after about ½ hour) and, as described above, nitrogen gas is introduced. The flow of nitrogen is continued until the vacuum shell is removed and the furnace emplaced. If a gas different from nitrogen is to be used as the annealing atmosphere, when the furnace is emplaced the system is switched to introduce this annealing gas. If nitrogen is the annealing atmospheric gas, the nitrogen flow is continued. As the nitrogen gas and/or other gas continues to flow, it will reduce any residuals of oxygen and water vapor as the atmosphere is continually exhausted and replaced as shown in the graph.

Thus the heating can commence much sooner according to this invention, as opposed to prior art practices. Further, dew point holds are not necessary since the water vapor has been substantially completely eliminated early in the cycle.

It will further be appreciated that since a very a short time is involved, a single vacuum shell can serve many bases, whereas the inner cover must remain on the base through the entire cycle.

What is claimed is:

1. In a bell type heating furnace wherein a furnace base is provided to support material being annealed, and an inner cover is removably positionable over said material supported on said base, an outer furnace member is removably placeable over said inner cover, and means are provided to supply a gas atmosphere within said inner cover, the improvement comprising, a vacuum shell unit seperate and independent from said outer furnace member removably positionable over said inner cover, said vacuum shell unit and said base having interacting sealing means to create a vacuum tight seal within said vacuum shell unit, and means to create a vacuum within said vacuum shell unit including within said inner cover, whereby a vacuum can be established within said inner cover followed by flowing a gas atmosphere within said inner cover, and said vacuum shell unit can be removed and replaced by said outer furnace member around said inner cover, to heat the work.

2. The invention as defined in claim 1, wherein said vacuum shell unit includes a dome portion and a flange portion, and wherein said sealing means include pneumatic tube means disposed to seal between said base and said flange portion.

3. The invention as defined in claim 1, wherein there are first means provided to supply a first gas to within said inner cover and within said vacuum shell unit, and second means provided to provide a second gas within said inner cover.

* * * * *